United States Patent [19]

Gryaznov et al.

[11] 4,394,294
[45] Jul. 19, 1983

[54] MEMBRANE CATALYST FOR HYDROGENATION OF ORGANIC COMPOUNDS AND METHOD FOR PREPARING SAME

[76] Inventors: Vladimir M. Gryaznov, Lomonosovsky prospekt 14, kv. 504; Viktor S. Smirnov, Kutuzovsky prospekt 26, kv. 555; Valentin M. Vdovin, Leninsky prospekt 23, kv. 90; Margarita M. Ermilova, ulitsa Cherkizovskaya 10, korpus 2, kv. 103, all of Moscow; Liya D. Gogua, ulitsa Arakishvili, 7, kv. 7, Tbilisi; Nina A. Pritula, ulitsa 3-ya Frunzenskaya, 14, kv. 87; Galina K. Fedorova, ulitsa Pyatnitskaya, 39, kv. 6, both of Moscow, all of U.S.S.R.

[21] Appl. No.: 223,074

[22] Filed: Jan. 7, 1981

[30] Foreign Application Priority Data

Jan. 20, 1977 [SU] U.S.S.R. .............................. 2451417

[51] Int. Cl.³ .................. B01J 31/08; B01J 31/06
[52] U.S. Cl. ............................ 252/430; 252/429 B
[58] Field of Search ........................... 252/430, 429 B

[56] References Cited

U.S. PATENT DOCUMENTS

| | | |
|---|---|---|
| 2,722,504 | 11/1955 | Fleck . |
| 3,210,162 | 10/1965 | Rudd . |
| 3,981,976 | 1/1976 | Stevens . |
| 4,132,668 | 1/1979 | Gryaznov et al. . |
| 4,134,900 | 1/1979 | Oswald .............................. 252/430 |
| 4,151,114 | 4/1979 | Oswald .............................. 252/430 |
| 4,157,313 | 6/1979 | Conan ................................ 252/430 |

FOREIGN PATENT DOCUMENTS 44-11362  5/1969  Japan .

OTHER PUBLICATIONS

Doklady Akademii Nauk SSR 211, No. 3, 624, (1973).

*Primary Examiner*—Arthur P. Demers

*Attorney, Agent, or Firm*—Ladas & Parry

[57] ABSTRACT

The membrane catalyst for hydrogenation of organic compounds according to the present invention comprises a cermet substrate with deposited thereonto, as a film, a product of interaction of a polyorganosiloxane polymer and a heterogenized palladium complex of the general formula:

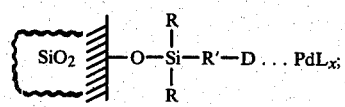

R=alkyl, alkoxy, chlorine;
R'=—$C_6H_4$—; —$(CH_2)_n$—, n=1–10;
D=—$PR_2''$, R''=alkyl, phenyl; —$NR_2'''$, R'''=alkyl; —$C_5H_4N$;
L=—Cl, —Br, —$OCOCH_3$.

The method for preparing a membrane catalyst for hydrogenation of organic compounds according to the present invention comprises application, onto a cermet substrate, of a mixture of a polyorganosiloxane polymer and a heterogenized palladium complex of the formula:

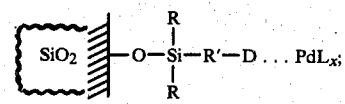

R=alkyl, alkoxy, chlorine:
R'=—$C_6H_4$—; —$(CH_2)_n$—, n=1–10;
D=—$PR_2''$, R''=alkyl, phenyl; —$NR_2'''$, R'''=alkyl; —$C_5H_4N$;
L=—Cl, —Br, —$OCOCH_3$.

and vulcanization thereof in the presence of a vulcanizing agent at a temperature ranging from 20° to 150° C. till the formation of a film with a thickness of from 0.3 to 1.0 mm.

11 Claims, No Drawings

MEMBRANE CATALYST FOR HYDROGENATION OF ORGANIC COMPOUNDS AND METHOD FOR PREPARING SAME

FIELD OF THE INVENTION

The present invention relates to the production of catalysts for the basic organic synthesis and, more specifically, to a membrane catalyst intended for hydrogenation of organic compounds and to a method for preparing same.

These catalysts are useful in the chemical and petrochemical industries owing to the possibility, ensured thereby, of carrying out two processes with detachment and addition of hydrogen without intermixing of the reaction products and at a higher speed than on conventional catalysts.

BACKGROUND OF THE INVENTION

Known in the art are polymer-based compositions, employed for improvement of adsorption of hydrocarbons and separation of hydrogen isotopes.

U.S. Pat. No. 2,722,504 teaches a composition consisting of a metal oxide ($Al_2O_3$, $MoO_3$, $CuO$, $V_2O_5$ and the like), an oxide or sulphide of a transition metal with an atomic weight of from 22 to 42 and silicone adapted for improvement of a selective adsorption of hydrocarbons compared to oxide materials untreated with silicone.

U.S. Pat. No. 3,981,976 teaches a composite catalyst for separation of hydrogen isotopes compared of a mixture of oxide of metals such as $AlO_2O_3$, $WO_3$, $MgO$, $SiO_2$ and the like, or of graphite with oxides of metals, of Group VIII of the periodic system and a polymer possessing hydrophobic properties.

There prior art compositions, however, cannot serve as membrane catalyst selectively permeable to hydrogen.

At the present time as hydrogen-permeable membrane catalysts use is made of palladium-based alloys manufactured as a foil, for example an alloy containing 85% by mass of Pd and 15% by mass of Pt (cf. Japanese Pat. No. 11362) or as a tube (U.S. Pat. No. 3,201,620). For the manufacture of such membranes a considerable consumption of palladium per 1 $cm^2$ of the catalyst surface area is required. Thus, for the manufacture of a catalyst as taught in Japanese Pat. No. 11362, it is required to use 0.24 g of palladium per 1 $cm^2$ of the catalyst surface; according to U.S. Pat. No. 3,201,162 0.20 g of Pd per 1 $cm^2$ of the catalyst surface area is required.

Also known in the art is a method for producing a hydrogen-permeable membrane catalyst by rolling as a foil with a thickness of from 0.05 to 0.1 mm of palladium or alloys thereof (cf. Doklady Akademii Nauk SSSR, 211, No. 3, 624, 1973).

With the view to save noble metals, there has been suggested a method for the manufacture of a membrane catalyst by sublimation of an alloy based on palladium onto a polymeric film selectively permeable for hydrogen; this film is applied onto a reinforcing substrate made of a sintered powder metal material and hindered no penetration of the reagents (cf. USSR Inventor's Certificate No. 593351 of Oct. 21, 1977; U.S. Pat. No. 4,132,668; Jan. 2, 1979).

This method makes it possible to produce a membrane catalyst in the form of a three-layered composition consisting of a sintered powder metal substrate based, for example, on copper, nickel, stainless steel, a polyorganosiloxane polymer film and a thin layer of a catalytically active palladium-based component.

In this catalyst the catalytically active component is used insufficiently due to a non-uniform thickness of the layer of palladium over a large area of the catalyst.

Furthermore, the size of this composite catalyst is limited thus causing limitation of a unit capacity of the catalytic hydrogenation plant. The limited size of this catalyst is due to small size of the vacuum chambers employed for sublimation of palladium. The composite membrane catalyst contains palladium or an alloy thereof in a low-disperse form, wherefor for the manufacture of a unit area of the catalyst surface a rather great amount of palladium is consumed.

OBJECT OF THE INVENTION

It is an object of the present invention to increase productivity of the membrane catalyst with a lowered consumption of palladium in its manufacture.

SUMMARY OF THE INVENTION

The object of the present invention is accomplished by a membrane catalyst for hydrogenation of organic compounds comprising a sintered powder metal substrate with deposited thereonto, as a film, a product of interaction of a polyorganosiloxane polymer and a heterogenized palladium complex of the general formula:

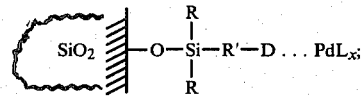

R=alkyl, alkoxy, chlorine;
R'=—$C_6H_4$—; —$(CH_2)_n$—, n=1–10;
D=—$PR''_2$, R''=alkyl, phenyl; —NR''', $2R'''$=alkyl; —$C_5H_4N$;
L=—Cl, —Br, —$OCOCH_3$.

The membrane catalyst possesses a high productivity per unit mass of palladium owing to the distribution of the active component throughout the volume of the membrane as well as owing to the possibility of ensuring a substantially unlimited unit capacity of hydrogenation plants.

Furthermore, the catalyst according to the present invention possesses a combination of properties of both a hydrogenation catalyst and a hydrogen-permeable membrane simultaneously with a reduced consumption of palladium for the manufacture thereof.

It is advisable, for improvement of catalytic properties and hydrogen permeability, that the membrane catalyst according to the present invention consist of the components taken in the following properties, percent by mass:

| | |
|---|---|
| sintered powder metal substrate | 50 to 89 |
| polyorganosiloxane polymer | 10 to 39 |
| heterogenized palladium complex | 1 to 4. |

It is preferable that the membrane catalyst according to the present invention, with a view to enhancing its activity, would contain, as a film, a product of interaction of a polyorganosiloxane polymer and a heterogenized palladium complex which is a complex compound of palladium attached to silica gel by means of chemically bonded therewith (through a ≡Si-O-Si-C system of bonds) organosilicon ligands with nitrogen- and phosphorus-containing electron donor groups.

It is advisable that the thickness of said film in the catalyst be within the range of from 0.3 to 1.0 mm for improvement of its hydrogen permeability.

The method for preparing the membrane catalyst for hydrogenation of organic compounds comprises application, onto a sintered powder metal substrate, of a mixture of a polyorganosiloxane polymer and a heterogenized palladium complex of the general formula:

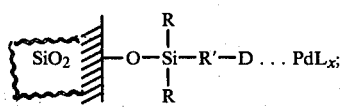

R=alkyl, alkoxy, chlorine;
R'=—C$_6$H$_4$—; —(CH$_2$)$_n$—, n=1-10;
D=—PR''$_2$, R''=alkyl, phenyl; —NR'''$_2$, R'''=alkyl; —C$_5$H$_4$N;
L=Cl, —Br, —OCOCH$_3$, followed by vulcanization of the mixture in the presence of a vulcanizing agent at a temperature within the range of from 20° to 150° C. till the formation of a film with a thickness of from 0.3 to 1.0 mm.

The method according to the present invention makes it possible to substantially simplify the process technology and shorten the duration of the catalyt manufacture due to the elimination of the stage of deposition, by spraying, of a catalytically active component based on palladium. The latter introduced into the catalyst in the form of a heterogenized complex. The method also enables the production of a catalyst of any size irrespective of the size of a high-vacuum spraying unit.

It is preferable to use, as the polyorganosiloxane polymer: polydimethylsiloxane or polymethylphenylsiloxane, containing 5 to 25 percent of phenyl groups by mass.

DETAILED DESCRIPTION OF THE INVENTION

A catalyst component is preliminarily prepared; it is a heterogenized palladium complex of the general formula:

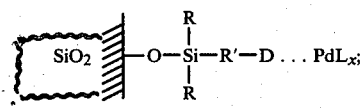

R=alkyl, alkoxy, chlorine;
R''=—C$_6$H$_4$—; —(CH$_2$)$_n$—, n=1-10;
D=—PR''$_2$, R''=alkyl, phenyl; —NR''', R'''=alkyl; —C$_5$H$_4$N;
L=—Cl, —Br, —OCOCH$_3$.

For this purpose a modified silica, e.g. silica gel, is treated with a solution of palladium salt, said inorganic carrier being modified with organosilicon compounds containing hydrolyzable groups attached to silicon and hydrocarbon radicals with functional groups capable of coordinating with compounds of metals of variable valency of the type: R$_3$SiR'D, wherein R$_3$Si contains at least one hydrolyzable group, R' is a hydrocarbon biradical; D is dialkylamino, pyridino or PR''$_2$ wherein R'' is alkyl or phenyl.

The resulting catalytically active component in the form of a heterogenized palladium complex is mixed with a polyorganosiloxan-α,ω-diol containing, as the vulcanizing agent, for example an aminosubstituted silane or alkyltriacetoxysilane and a filler such as zinc oxide in a ratio of from 1:5 to 1:15 by mass. This mixture is applied in a thin layer (with a thickness of from 0.3 to 1.0 mm) onto the surface of a sintered powder metal sheet material based, for example, on nickel, copper or stainless steel and subjected to vulcenization at a temperature within the range of from 20° to 150° C. The film formed as a result of the vulcanization of the mixture of an organosilicon polymer and a heterogenized palladium complex possesses characteristics of a hydrogenation catalyst and a hydrogen-permeable membrane. The thickness of the reinforcing substrate—a sintered powder metal material is varied within the range of from 0.1 to 1.0 mm depending on the necessity of adjust gas-permeability of the whole composition. A thickness exceeding 1 mm hinders hermetization of the membrane catalyst in a reactor, since upon increasing of the material thickness cermet sheets become brittle. The use of a sintered powder metal sheet with a thickness of below 0.1 mm is limited by a high gas-permeability of the material. Hydrogen-permeability of the membrane catalyst is also adjusted by varying the thickness of the polyorganosiloxane film within the range of from 0.3 to 1.0 mm. Optimization of the properties of the polyorganosiloxane film is attained by varying the time, vulcanization temperature, type and quantity of the filler and vulcanizing agent. The catalyst productivity in reactions of hydrogenation of organic compounds can be adjusted by varying the ratio of the polyorganosiloxane polymer and heterogenized palladium complex within the range of from 1:5 to 1:15.

It is desirable to vary the proportions of the ingredients in the process of manufacture of the membrane catalyst in such a manner that the components be contained in the following amounts, percent by mass:

| | |
|---|---|
| sintered powder metal substrate | 50 to 89 |
| polyorganosiloxane polymer | 10 to 39 |
| heterogenized palladium complex | 1 to 4. |

This membrane catalyst has a high catalytic activity and a high productivity per unit mass of palladium.

The resulting membrane catalyst comprises a bi-layered composition consisting of a layer of a porous cermet material employed as a reinforcing substrate and a thin polymeric film which is catalytically active and hydrogen-permeable; it also contains palladium in a highly active state in contrast to membrane catalyst made of a palladium alloy.

Consumption of palladium per 1 cm$^2$ of the surface area of the catalyst according to the present invention is 0.004 g or by about 100 times lesser than in conventional membrane catalyst manufacture from palladium alloys.

For a better understanding of the present invention, some specific Examples are given hereinbelow by way of illustration.

EXAMPLE 1

To 2 g of silica gel modified by dimethylethoxy (methyldiethylamino)silane in 60 ml of a benzene-ethanol solution (1:1) there is added 0.6 g of palladium chloride as a 40% aqueous solution. The reaction mixture is kept at room temperature for 24 hours. Then silica gel is filtered off, washed twice (50 ml each time) with a benzene-ethanol solution and twice (50 ml each time) with absolute ethanol; thereafter silica gel is dried under a vacuum of $1.10^{-4}$ mm Hg during 6 hours at room temperature. A heterogenized complex with palladium content of 2.2 mass % is thus obtained.

0.18 g of the resulting catalyst with the particle size of <0,1 mm is mixed with 0.9 g of polydimethylsiloxane-α,ωdiol containing zinc oxide as a filler and methyltriacetoxysilane as a vulcanizing agent (in a ratio of 3 parts by mass: 100 parts by mass of the polymer). This matrix is applied onto a sheet of porous copper with the dimensions of 119×22×0.1 mm. After vulcanization in air at room temperature for two days the sample is set under vacuum of $10^{-3}$ mm Hg for 6 hours to give a polymeric film with the thickness of 0.3 mm.

The resulting membrane catalyst is mounted and sealed in a flow-type reactor adapted for carrying out hydrogenation reactions. On one side of the membrane catalyst hydrogen is supplied while on the other—a mixture of vapours of cyclopentadiene with argon is supplied at the rate of 10 ml/min. The partial pressure of cyclopentadiene is 8.5 mm Hg, that of hydrogen in the hydrogenation zone is 11.4 mm Hg. At the temperature of 161° C. the conversion of cyclopentadiene is 89,8% at the selectivity relative to cyclopentene of 0,95.

EXAMPLE 2

The membrane catalyst is produced by following the procedure described in the foregoing Example 1, except that use is made of silica gel modified with dimethylethoxy(diphenylphosphi-nomethyl)silane. Heterogenized palladium complex with the content of palladium equal to 4.6 mass % is obtained. The mixture of polydimethylsiloxane and heterogenized palladium complex in the ratio of 5:1 is applied as a 0.5 mm thickness film onto a sheet of porous nickel with the size of 119×22×1 mm. The resulting catalyst has the following composition, percent by mass: sintered powder metal material—76, polydimethylsiloxane poly—20; palladium complex—4.

In a flow-type catalytic reactor hydrogen is fed onto one side of the membrane catalyst and a mixture of cyclopentadiene vapours with argon is fed onto the other side of the membrane catalyst at the rate of 10 ml/min; partial pressure of cyclopentadiene in the reaction zone is 8.5 mm Hg, that of hydrogen is 11.4 mm Hz at the temperature of 100° C. The achieved cyclopentadiene conversion is 86.6% at the selectivity of 0.82 relative to cyclopentene.

EXAMPLE 3

On the basis of silica gel modified by triethyloxy[β-(2-ethylpyridyl)] silane, by following the procedure described in Example 1, a heterogenized palladium complex is obtained containing 5.5% by mass of palladium.

Further the membrane catalyst is prepared as in Example 1, but the mixture of polydimethylsiloxane and palladium complex heterogenized on silica gel is applied as 1 mm thick film onto a sheet of porous copper with the size of 119×22×0.5 mm. The resulting catalyst has the following composition, percent by mass:

| | |
|---|---|
| sintered powder metal substrate | 57 |
| polydimethylsiloxane | 39 |
| heterogenized palladium complex | 4. |

In a reactor this catalyst is employed at the temperature of 88° C., the supply rate of cyclopentadiene vapours with argon of 10 ml/min, partial pressure of cyclopentadiene in the hydrogenation zone of 8.5 mm Hg and that of hydrogen of 11.4 mm Hg; the conversion of cyclopentadiene of 98.9% is attained at the selectivity of 0.79 relative to cyclopentene.

EXAMPLE 4

The membrane catalyst is produced by following the procedure of Example 2 hereinbefore. The heterogenized palladium complex prepared on the basis of silica gel, modified by dimethylethoxy(diphenylphosphinomethyl)silane, with the particle size of <0,1 mm containing 2.8 mass % of palladium, was mixed with a polymethylphenylsiloxane polymer (containing 5% phenyl substituents at the silicon) in the ratio of 1:10 and applied onto a sheet of porous copper with the size of 119×22×0.5 mm. The vulcanization was conducted at the temperature of 25° C. for 3 hours and then at the temperature of 150° C. for one hour. To obtain a film with the thickness of 0,3 mm. The resulting catalyst has the following composition, percent by mass:

| | |
|---|---|
| sintered powder metal substrate | 89 |
| polymethylphenylsiloxane | 10 |
| heterogenized palladium complex | 1. |

On this catalyst in a reactor at the temperature of 100° C., rate of supply of a mixture of cyclopentadiene vapours and argon of 10 ml/min, partial pressure in the zone of cyclopentadiene (CPD) hydrogenation of 8.5 mm Hg and that of hydrogen of 11.4 mm Hg, the conversion of CPD of 86.6% is obtained at the selectivity of 0.82 relative to cyclopentene.

EXAMPLE 5

The membrane catalyst is produced as described in Example 1, the modification of silica gel being carried out with the use of dimethylethoxy (γ-diphenylphosphinopropyl)silane. The heterogenized palladium complex with the particle size of <0,1 mm containing 3.0% by mass of palladium was mixed with polydimethylsiloxane polymer in the ratio of 1:15 and applied onto a sheet of porous copper with the dimensions of 119×22×0.5 mm. The vulcanization was conducted at the temperature of 25° C. for 8 hours and then at 70° C. for two hours to obtain a film with the thickness of 0.4 mm.

The thus-produced catalyst has the following composition, percent by mass;

| | |
|---|---|
| sintered powder metal substrate | 80 |
| polydimethylsiloxane polymer | 16 |
| heterogenized palladium complex | 4. |

In a reactor on this catalyst at the temperature of 20° C., the rate of supply of a mixture of cyclopentadiene vapours with argon of 10 ml/min, partial pressure of cyclopentadiene in the hydrogenation zone of 8.5 mm Hg and that of hydrogen of 11.4 mm, the conversion of cyclopentadiene of 97.7% is obtained at the selectivity of 0.75 relative to cyclopentene.

What is claimed is:

1. A membrane catalyst for hydrogenation of organic compounds comprising a porous metal substrate selected from the group consisting of porous stainless steel, porous copper and porous nickel, having thereon a vulcanized film comprising a polyorganosiloxane polymer and a heterogenized palladium complex of the formula

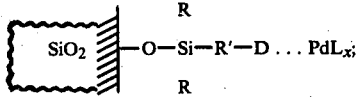

wherein
R=alkyl, alkoxy or chlorine
R'=—C$_6$H$_4$— or —(CH$_2$)$_n$— and n=1–10
D=PR''$_2$ wherein R''=alkyl or phenyl; N R'''$_2$ wherein
R'''=alkyl or C$_5$H$_4$N
L=—CL, Br or OCOCH$_3$.

2. A membrane catalyst according to claim 1, containing the components in the following proportions, percent by mass:

| porous metal substrate | 50 to 89 |
| polyorganosiloxane polymer | 10 to 39 |
| heterogenized palladium complex | 1 to 4. |

3. A membrane catalyst according to claim 1, containing, as a film, a product of interaction of a polyorganosiloxane polymer and a palladium complex heterogenized through pyridinium ligand.

4. A membrane catalyst according to claim 1, containing, as a film, a product of interaction of a polyorganosiloxane polymer and palladium complex heterogenized through tertiary amine ligand.

5. A mixture catalyst according to claim 1, containing, as a film, a product of interaction of a polyorganosiloxane polymer and a palladium complex heterogenized through a tertiary phosphine ligand.

6. A membrane catalyst according to claim 1, containing, as a film, a product of interaction of a heterogenized complex of palladium and polydimethylsiloxane.

7. A membrane catalyst according to claim 1, containing, as a film, a product of interaction of a heterogenized complex of palladium and polymethylphenylsiloxane.

8. A membrane catalyst according to claim 1, wherein the film thickness is equal to 0.3–1.0 mm.

9. A method for preparing a membrane catalyst for hydrogenation of organic compounds, comprising application, onto a porous metal substrate, of a mixture of a polyorganosiloxane polymer and a heterogenized palladium complex of the formula:

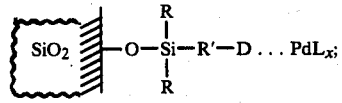

R=alkyl, alkoxy, chlorine;
R'=—C$_6$H$_4$—; —(CH$_2$)$_n$; n=1–10;
D=—PR''$_2$, R''=alkyl, phenyl; —NR'''$_2$, R'''=alkyl; —C$_5$H$_4$N—;
L=—Cl, —Br, —OCOCH$_3$
and vulcanization thereof in the presence of a vulcanizing agent at a temperature of from 20° to 150° C. till the formation of a film with a thickness of from 0.3 to 1.0 mm.

10. A method according to claim 9, wherein as the polyorganosiloxane polymer use is made of polydimethylsiloxane.

11. A method according to claim 10 wherein as the polyorganosiloxane polymer used is made of polymethylphenylsiloxane.

* * * * *

UNITED STATES PATENT AND TRADEMARK OFFICE
CERTIFICATE OF CORRECTION

PATENT NO. : 4,394,294

DATED     : July 19, 1983

INVENTOR(S) : Vladimir M. Gryaznov, et al

It is certified that error appears in the above-identified patent and that said Letters Patent is hereby corrected as shown below:

On the title page delete:

"[30] Foreign Application Priority Data
Jan. 20, 1977 [SU]   U.S.S.R. .........2451417"

Signed and Sealed this

Fourth Day of October 1983

[SEAL]

Attest:

GERALD J. MOSSINGHOFF

*Attesting Officer*     *Commissioner of Patents and Trademarks*